Patented Apr. 25, 1933

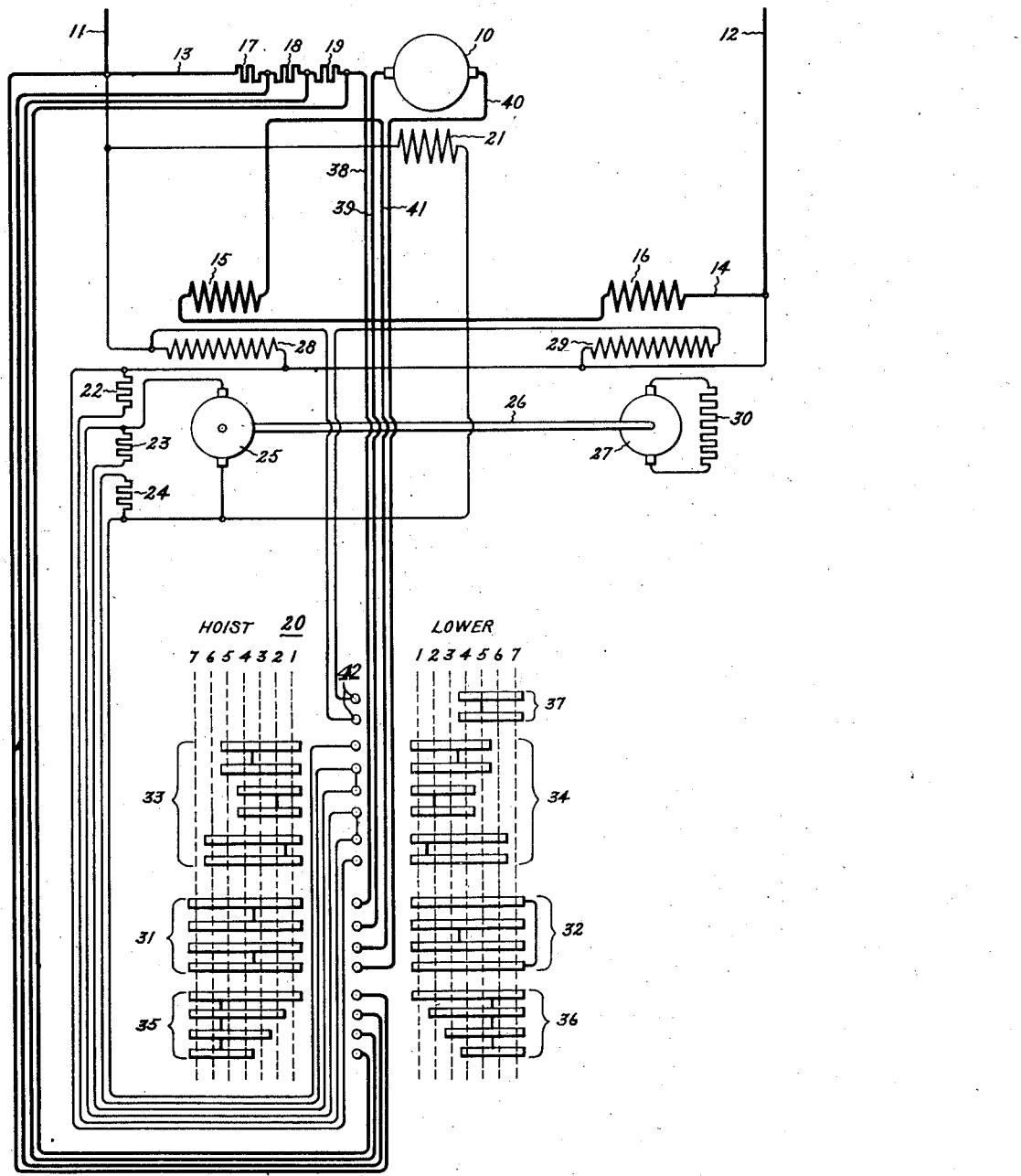

1,905,693

UNITED STATES PATENT OFFICE

WALTER ENDRES AND HERBERT HOOTZ, OF BERLIN, GERMANY, ASSIGNORS TO GENERAL ELECTRIC COMPANY, A CORPORATION OF NEW YORK

MOTOR CONTROL SYSTEM

Application filed October 20, 1931, Serial No. 570,006, and in Germany October 30, 1930.

This invention relates to motor control systems, more particularly to systems in which direct current shunt wound motors are utilized for driving loads requiring low torque at high speeds and high torque at low speeds, such for example as lifting gear and the like and it has for an object the provision of a simple, reliable and improved motor control system of this character.

A series motor is well adapted for driving loads of this character since its speed increases as the torque requirements of the load decrease. However, the increase obtainable without regulation is limited as for example when liftng the empty hook of a crane, only about double the full load speed is attained. For this reason the series motor is utilized much less effectively with light loads than with full loads. Regulation is inconvenient since it is usually effected in the main circuit by means of a resistance connected in parallel relationship with the series field winding. It is also possible to employ a shunt motor the speed of which is regulated for light loads by weakening the field. However, when operating either a shunt motor or a series motor with a weakened field there is a danger of overloading the motor which can only be protected aganst by the addition of expensive apparatus which may fail despite the most careful attention and maintenance.

The invention comprises a circuit arrangement which provides for a considerably greater increase in the speed and a more effective utilization of the driving motor in the case of light loads, but which at the same time eliminates the above-mentioned disadvantages.

In carrying the invention into effect in one form thereof, a series characteristic is imparted to a main direct current shunt motor by means of an auxiliary motor having its armature connected in the field circuit of the main motor and excited in inverse proportion to the load on the main motor.

More specifically, a main direct current shunt motor is regulated in a series of fine steps in the first positions of suitable control apparatus by armature series or parallel resistance in the usual manner, and in the field weakening positions of the controller, a series characteristic is imparted to the main shunt motor by means of a self-regulating set. This self-regulating set consists of a small auxiliary motor which is mechanically or electrically loaded by means of a generator, an eddy current brake or the like. The operation of the set is dependent on the armature current of the main motor the field series resistance of which, or a portion of which is connected in parallel with the armature of the motor of said self-regulating set.

For a better, and more complete understanding of the invention reference should now be had to the following specification and to the accompanying drawing, the single figure of which is a simple diagrammatical illustration of an embodiment of the invention.

Referring now to the drawing the armature of a main direct current shunt motor 10 is supplied from any suitable source such for example as that represented in the drawing by the supply lines 11, 12 to which the motor terminals are connected by conductors 13 and 14; series field windings 15 and 16, starting resistance sections 17, 18 and 19 and the reversing segments of a multi-position switching device 20 being included in the circuit. As shown in the drawing, the main driving motor 10 is provided with a shunt field winding 21 in the circuit of which are included sections 22, 23 and 24 of a field weakening resistance. To the terminals of the sections 23 and 24 of this resistance is connected the armature of a small auxiliary motor 25, the drive shaft 26 of which is mechanically connected with a loading generator 27. The small auxiliary motor 25 is provided with a shunt field winding 28 and with the differentially wound field winding 15 which, as previously stated, is connected in series relationship with the armature of the main motor 10. The loading generator 27 is provided with a field winding 16 likewise connected in series relationship with the armature of the main motor 10 and is also provided with a separately excited field winding 29 which is connected in parallel relationship with the armature of the motor 10 when the controller 20 is operated in the lowering direction. This separately excited field winding 29 is so connected that its magnetic field acts cumulatively with that due to the series field winding 16, thereby increasing the braking effect of the generator 27. A braking resistance 30 is connected to the armature terminals of the generator 27.

The switching device 20 is illustrated in the drawing as a manually operable multi-position speed governing drum controller which is operable from a neutral position in either of opposite directions as represented by the arrows. As shown, the controller 20 is provided with groups of reversing segments 31 and 32 which provide for reversal of the direction of the armature current of the main motor 10 responsively to operation of the controller in opposite directions, so as to cause the motor to rotate in either a hoisting direction or lowering direction as desired. The controller 20 is further provided with groups of segments 33 and 34 upon the hoisting and lowering sides respectively, for controlling the sections 22, 23 and 24 of the main motor field weakening resistance and groups of segments 35 and 36 on the hoisting and lowering sides respectively for controlling the sections 17, 18 and 19 of the main motor armature resistance. A pair of contacts 37 is also provided on the drum controller for establishing connections between the separately excited field winding 29 of the generator 27 supply lines 11, 12 when the drum controller 20 is operated to its fourth position in the lowering direction.

With the above understanding of the apparatus and its organization in the system, the operation of the system itself will readily be understood from the detailed description which follows:

The drum controller 20 is operated to the first position in the hoisting direction in which the group of segments 33 establish a short circuit about the resistance sections 22, 23 and 24 so that the armature of the auxiliary motor 25 which is connected to the terminals of the sections 23, 24 is likewise short circuited and the regulating set is therefore ineffective. In this position of the controller, the armature of the main motor 10 is connected to the supply source 11, 12 over a circuit extending from the side 11 of the supply source through conductor 13, resistance sections 17, 18 and 19, conductor 38, upper pair of reversing segments 31, conductor 39, armature of motor 10, conductor 40, lower pair of reversing segments 31, conductor 41, series field windings 15 and 16, and thence by conductor 14 to the opposite side 12 of the supply source.

In the second, third and fourth positions of the controller 20, the resistance sections 17, 18 and 19 are respectively short circuited by the segments 35.

In the fifth position of the controller the middle pair of segments 33 passes out of engagement with its cooperating stationary fingers and thus removes the short circuit from about the resistance section 23. As a result, this section of the resistance is connected in series relationship with the shunt field winding 21 of the main motor 10 and the armature of the auxiliary motor 25 is energized in accordance with the voltage drop across the resistance section 23. The auxiliary motor 25 commences to rotate in response to its energization and drives the armature of the generator 27. It will be observed that the separately excited field winding 29 of generator 27 is not excited in the hoisting positions of the controller since its connections are open at the fingers 42.

Since the field windings 15 and 28 of the auxiliary motor 25 are differentially wound the auxiliary motor 25 tends to rotate at high speed and consequently a high braking voltage and also a large braking energy is developed by the generator 27. In order to accomplish this, the auxiliary motor 25 must draw a large armature current from the source 11, 12 and this current also traverses the shunt field winding 21 of the main motor 10. As the load on the main motor 10 increases, its armature current likewise increases resulting in weakening the excitation of the auxiliary motor 25 and causing its speed to increase. The load on the generator 27 is correspondingly increased due to the increase in speed at which the generator is driven and further due to the increase in excitation of the generator which results when the armature current of the main motor 10 increases. It will thus be seen that the armature current of the auxiliary motor 25 must increase and this increased armature current traverses the field winding of the main motor 10 thereby increasing the excitation of the motor 10 and reducing its speed in an amount proportional to the decrease in its excitation which resulted when the short circuit was removed from the resistance section 23. It will be seen that the self-regulating step balances an attempt to weaken the field of the main motor 10, according to the measure of the load thereon.

The fields are so balanced, that if full load is imposed upon the driving motor 10, the additional current traversing the field 21 through the armature of the auxiliary motor 25 just balances the field weakening. In the same manner, as the load on the main motor 10 is decreased, the additional current drawn from the source 11, 12 by the auxiliary motor 25 decreases, thereby decreasing the excitation of the main motor 10 and rendering the field weakening operation (i. e., insertion of the resistance section 23) effective. It will thus be seen that with decreasing load the excitation of the main driving motor 10 decreases and its speed increases rapidly and that with increasing load on this motor its excitation increases and its speed decreases correspondingly. The motor 10 thus has a series characteristic. In actual practice the increase in speed which is sought to be obtained is primarily limited by the consideration of good commutation.

In the sixth position of the drum controller 20, the short circuit about the resistance section 24 is removed and the excitation of the motor 10 correspondingly weakened. This weakening takes place gradually because of the balancing effect of the self-regulating set. The decrease in excitation of the main driving motor 10, however, entails an increase in the armature current since the product of armature current times field must be constantly maintained for any given torque. As a result of the increase in armature current of the motor 10, the excitation due to the series field windings 15 and 16 is increased and consequently the load on the generator 30 is correspondingly increased whilst the speed of the auxiliary motor 25, in spite of its increased load, likewise tends to increase as a result of its greater differential compounding. The increase in load on the auxiliary motor 25, however, entails a greater current consumption in its armature, that is to say, a strengthening of the field 21 of the driving motor 10 and thus limiting the armature current of the latter to a value demanded by the actual load. If the load on the motor 10 is decreased, the excitations due to the field windings 15 and 16 are correspondingly weakened and therefore the effectiveness of the self-regulating set is weakened and as a result the current traversing the field winding 21 of the driving motor decreases so that the speed of the driving motor automatically increases to a higher speed, which as will be understood has a different value for every load value. It will be observed that the section 22 of the field weakening resistance is not subject to control by the self-regulating set. This section of the field weakening resistance serves when the drum controller 20 is operated to its last position to provide an especially rapid acceleration of the driving motor 10 for very light loads such for example as the empty hook of a crane. The insertion of the resistance section 22, i. e. the removal of the short circuit therefrom, effects a weakening of the excitation of the motor on the one hand and reduces the effect of the self-regulating set on the other hand since the voltage drop across the resistance sections 23 and 24 is decreased when the resistance section 22 is added in circuit therewith. The characteristic curve obtained as a result of adding the resistance section 22 will not be a series curve nor will it be a shunt curve but it will be a curve that is intermediate between the series and shunt characteristics and will correspond more to that of a compound wound motor.

In order to exclude the use of this rapid hoisting position with large loads the drum switch is provided with a slot in which the control lever is guided and this slot has a side wing which attracts the operator's attention. A wrong or unintended use of this position of the drum controller renders the overload protective equipment effective.

The lowering operation is similar to the hoisting operation and will readily be understood from the above description of the hoisting operation. These operations are different, however, when the voltage and current of the driving motor 10 pass through zero with an overhauling load. The excitation due to the field windings 15 and 16 reverse when the armature current of the motor 10 reverses as the load starts to overhaul the motor. The auxiliary motor 25 is now no longer differentially compounded, but is cumulatively compounded; that is it thus tends to operate at a lower speed so that the braking energy of the load generator 27 is diminished. It will also be observed that the currents traversing the series field windings 15 and 16 are smaller than is the case when the motor 10 is hoisting the same load. This improves somewhat the conditions of the regulating motor 25 but diminishes the effectiveness of the loading generator due to the decrease in its excitation. In order to overcome this disadvantage and to restore the effectiveness of the self-regulating step to its full value, the separately excited field winding 29 of generator 27 is connected to the supply source 11, 12 by means of the pair of segments 37 when the drum controller 20 is operated to its fourth position in the lowering direction, at which position it will be observed the field weakening segments 34 become effective. The separately excited field winding 29 is so arranged and connected that it acts cumulatively with the series field winding 16 and consequently the effectiveness of the self-regulating step is increased due to the increased excitation and resulting load on the generator.

If the load overhauls the main driving motor 10 too rapidly, the armature current is greatly increased thereby increasing the effectiveness of the self-regulating set so that the speed of the main driving motor cannot exceed the value corresponding to the load. If desired the series field winding 15 can be disconnected by means of suitable segments on the drum controller 20 so that the auxiliary motor 25 will operate as a pure shunt motor when the drum controller is operated in the lowering direction.

With the above described arrangement substantially constant output can be obtained for all loads on the driving motor 10. The effectiveness of the lifting gear is utilized to a very high degree and consequently the ideal of the lifting gear motor is substantially attained. The invention also results in the reduction in the size of the necessary control apparatus since many more positions are required on the drum controller to obtain the same increase in speed that is attained by the above described arrangement. The operation of the driving motor itself remains stable at all positions of the drum controller, even for maximum speed, and in the lowering direction provides for pumping energy into the line in the event of an overhauling load. The inventon also effects an economy in the driving motor since a compensating winding is no longer required because the self-regulating set functions in a well understood manner to prevent excessively rapid variations of the field current and consequently of the armature current.

Although in accordance with the provisions of the patent statutes, I have described this invention as embodied in concrete form, I would have it understood that the invention is not limited to the specific apparatus and connections described and illustrated since the modifications and alterations will readily suggest themselves to persons skilled in the art without departing from the true spirit of this invention or from the scope of the annexed claims.

What we claim as new and desire to secure by Letters Patent of the United States, is:

1. In a motor control system the combination with a main direct current shunt motor, of means for imparting a series characteristic to said motor comprising an auxiliary motor having its armature connected in the field circuit of said main motor and excited in inverse proportion to the load on said main motor.

2. In a motor control system, a main direct current shunt motor, an auxiliary motor provided with a field winding and having its armature connected in the field circuit of said main motor, and means for exciting said auxiliary motor in inverse proportion to the load on said main motor comprising a second field winding connected in the armature circuit of said main motor and wound differentially with respect to said first mentioned field winding.

3. In a motor control system the combination with a main direct current shunt motor, of means for imparting a series characteristic to said motor comprising an auxiliary motor having its armature connected in the field circuit of said main motor and differentially excited with respect to the load thereof, and a generator driven by said auxiliary motor and excited in accordance with the load on said main motor.

4. In a motor control system, a direct current shunt motor, control device operable to one position to vary the armature current of said motor and operable to a second position to vary the excitation thereof, and means comprising an auxiliary dynamo electric machine operable in said field weakening position to impart a series characteristic to said motor.

5. In a motor control system, a direct current shunt motor, a multi-position speed governing controller operable to a plurality of positions to control the armature current of said motor, and operable to a plurality of positions to control the field excitation of said motor, and means comprising an auxiliary motor rendered effective responsively to operation of said controller to said excitation control positions to impart a series characteristic to said motor.

6. In a motor control system, a direct current shunt motor, means for imparting a series characteristic to said motor comprising a regulating dynamo electric machine, control means for said motor comprising a switching device having armature and excitation control positions and connections established in said excitation control position for rendering said regulating machine effective.

7. In a motor control system, a main direct current shunt motor, a resistance device for controlling the excitation of said motor, an auxiliary motor excited in inverse proportion to the load on said main motor and having its armature connected in parallel with a portion of said resistance, a control device having a plurality of operative positions including excitation control positions, and connections established in the said excitation control positions for rendering said resistance device effective.

8. A motor control system comprising a main direct current shunt motor, a field weakening resistance for said motor an auxiliary motor having its armature connected in parallel with a portion of said resistance and provided with a pair of differentially wound field windings, one of said windings being connected in the armature circuit of said main motor whereby said auxiliary motor is differentially excited in accordance with the load on said main motor, a multi-position speed governing controller having armature and field control positions, and electrical connections established in said field control positions for rendering said resistance device and said auxiliary motor effective so that a series characteristic is imparted thereto.

9. A system for controlling the operation of an electric motor comprising a main direct current shunt motor, means for imparting a series characteristic to said motor comprising a resistance device connected in the field circuit of said motor and a regulating set comprising an auxiliary motor provided with a separately excited field winding and a differentially wound field winding included in the armature circuit of said main motor, and a generator driven by said auxiliary motor and provided with a field winding excited in accordance with the load on said main motor, speed control means for said main motor comprising a multi-position switching device having a plurality of armature control positions and a plurality of excitation control positions, and connections established in said excitation control positions for rendering said resistance and said regulating set effective.

10. A motor control system comprising a main direct current shunt motor, a resistance device connected in the field circuit of said motor, means for imparting a series characteristic to said motor comprising an auxiliary motor having its armature connected to a portion of said resistance provided with a pair of differentially wound field windings, one of said windings being connected in the armature circuit of said main motor, and a generator driven by said auxiliary motor and provided with a field winding connected in the armature circuit and an additional field winding, a multi-position speed governing controller having a hoisting side and a lowering side each having a plurality of armature and excitation control positions, electrical connections established in said excitation control positions for rendering said resistance and said auxiliary motor effective and electrical connections established on the lowering side of said controller for connecting said additional field winding so that both of said generator field windings act cumulatively.

11. A motor control system comprising a main direct current shunt motor, a resistance device having a plurality of sections, means for imparting a series characteristic to said motor comprising a regulating set, said set comprising an auxiliary motor having its armature connected in parallel with certain of said resistance sections and provided with a separately excited field winding and a differentially wound field winding connected in the armature circuit of said main motor and a generator driven by said motor and provided with a field winding connected in the armature circuit of said main motor, speed control means for said motor comprising a controller having a plurality of field weakening positions, electrical connections established in one of said field weakening positions for rendering said certain resistance sections and said regulating set effective and electrical connections established in another of said field weakening positions for modifying the effect of said regulating set.

In witness whereof, we have hereunto set our hands.

WALTER ENDRES.
HERBERT HOOTZ.